(12) United States Patent
Marchetto

(10) Patent No.: US 8,176,684 B2
(45) Date of Patent: May 15, 2012

(54) METHOD AND DEVICE FOR AUTOMATIC SYSTEMS DESIGNED TO OPERATE MOVABLE BARRIERS

(75) Inventor: Oscar Marchetto, Oderzo (IT)

(73) Assignee: Nice SpA, Oderzo (Treviso) (IT)

( * ) Notice: Subject to any disclaimer, the term of this patent is extended or adjusted under 35 U.S.C. 154(b) by 603 days.

(21) Appl. No.: 11/666,839

(22) PCT Filed: Nov. 3, 2005

(86) PCT No.: PCT/EP2005/055722
§ 371 (c)(1),
(2), (4) Date: May 1, 2007

(87) PCT Pub. No.: WO2006/051060
PCT Pub. Date: May 18, 2006

(65) Prior Publication Data
US 2008/0016771 A1    Jan. 24, 2008

(30) Foreign Application Priority Data

Nov. 10, 2004  (IT) .............................. TV2004A0128

(51) Int. Cl.
*E06B 3/00* (2006.01)

(52) U.S. Cl. ................... 49/506; 49/49; 49/360

(58) Field of Classification Search ................ 49/25, 26, 49/27, 28, 360, 506; 318/264, 265, 266, 318/282, 286, 466, 467, 468, 469
See application file for complete search history.

(56) References Cited

U.S. PATENT DOCUMENTS

| | | | | |
|---|---|---|---|---|
| 4,577,437 A | * | 3/1986 | Gionet et al. | 49/25 |
| 4,698,967 A | * | 10/1987 | Longora | 60/325 |
| 4,851,746 A | * | 7/1989 | Milke | 318/467 |
| 4,888,532 A | * | 12/1989 | Josson | 318/480 |
| 4,894,952 A | * | 1/1990 | Trett et al. | 49/25 |
| 4,967,083 A | * | 10/1990 | Kornbrekke et al. | 250/341.7 |
| 5,015,840 A | * | 5/1991 | Blau | 250/221 |
| 5,142,152 A | * | 8/1992 | Boiucaner | 250/341.7 |
| 5,198,974 A | | 3/1993 | Orsat | |
| 5,285,136 A | | 2/1994 | Duhame et al. | |

(Continued)

FOREIGN PATENT DOCUMENTS

DE    4440449    6/1995
(Continued)

OTHER PUBLICATIONS

Internationl Search Report dated Feb. 23, 2006 from the corresponding International Patent Application No. PCT/EP2005/055722.

(Continued)

*Primary Examiner* — Jerry Redman
(74) *Attorney, Agent, or Firm* — Katten Muchin Rosenman LLP

(57) ABSTRACT

Method, together with the devices implementing said method, for controlling the closing and opening movements of a movable barrier (103) so as to prevent a dangerous impact with an obstacle or crushing thereof, said movable barrier (103) comprising a closing edge having, positioned thereon, one or more sensors (108) connected to a first transceiver (27*b*) able to exchange a signal with a second fixed transceiver (27*a*) in communication with a control unit which manages the movement of the barrier (103), comprising a step defining for said signal a communications protocol consisting of more than two signal configurations (A, B, C, D).

18 Claims, 6 Drawing Sheets

U.S. PATENT DOCUMENTS

| | | | | |
|---|---|---|---|---|
| 5,373,664 | A | * | 12/1994 | Butler ............... 49/358 |
| 5,581,944 | A | * | 12/1996 | Kornbrekke et al. ......... 49/28 |
| 5,583,334 | A | * | 12/1996 | Baumann ............... 250/221 |
| 5,596,840 | A | | 1/1997 | Teich et al. |
| 5,801,376 | A | * | 9/1998 | Haberl et al. ........... 250/221 |
| 5,828,302 | A | * | 10/1998 | Tsutsumi et al. ......... 340/540 |
| 5,963,000 | A | * | 10/1999 | Tsutsumi et al. ......... 318/480 |
| 6,032,415 | A | | 3/2000 | Tajima |
| 6,092,338 | A | * | 7/2000 | Crowner et al. ............ 49/360 |
| 6,167,991 | B1 | * | 1/2001 | Full et al. ............... 187/317 |
| 6,181,095 | B1 | | 1/2001 | Telmet |
| 6,215,265 | B1 | | 4/2001 | Wolfer et al. |
| 6,243,006 | B1 | | 6/2001 | Rejc et al. |
| 6,247,558 | B1 | * | 6/2001 | Bailey et al. ............ 187/317 |
| 6,279,687 | B1 | * | 8/2001 | Pustelniak et al. ........ 187/317 |
| 6,329,774 | B1 | * | 12/2001 | Ariav ................... 318/282 |
| 6,678,999 | B2 | * | 1/2004 | Zengguang et al. ........ 49/25 |
| 6,750,441 | B2 | * | 6/2004 | Imahori et al. .......... 250/221 |
| 6,782,660 | B2 | * | 8/2004 | Takada et al. ............ 49/25 |
| 6,914,401 | B2 | * | 7/2005 | Semelka ............... 318/480 |
| 7,038,409 | B1 | | 5/2006 | Mullet |
| 7,109,677 | B1 | * | 9/2006 | Gagnon et al. ......... 318/466 |
| 7,132,813 | B2 | * | 11/2006 | Gregori et al. .......... 318/466 |
| 2003/0150164 | A1 | | 8/2003 | Mehalshick et al. |
| 2007/0113481 | A1 | * | 5/2007 | Kato et al. ............... 49/360 |
| 2009/0229183 | A1 | * | 9/2009 | Kamiya ................. 49/28 |

FOREIGN PATENT DOCUMENTS

| | | |
|---|---|---|
| DE | 4445978 | 6/1996 |
| DE | 19610877 | 1/1997 |
| DE | 19706209 | 5/1998 |
| EP | 0497711 | 8/1992 |
| EP | 0 803 632 A | 10/1997 |
| FR | 2721652 | 12/1995 |
| FR | 2790787 | 9/2000 |

OTHER PUBLICATIONS

Chinese Office Action dated Dec. 26, 2008, from the corresponding Chinese Application.

International Search Report dated Mar. 20, 2007 from corresponding PCT/EP2006/068183.

International Preliminary Report on Patentability dated Feb. 25, 2008 from corresponding PCT/EP2006/068183.

* cited by examiner

METHOD AND DEVICE FOR AUTOMATIC SYSTEMS DESIGNED TO OPERATE MOVABLE BARRIERS

This application is a National Phase Application of International Application No. PCT/EP2005/055722, filed Nov. 3, 2005, which claims the benefit under 35 U.S.C. 119 (a-e) of Italian Application No. TV2004A000128 filed Nov. 10, 2004, which is herein incorporated by reference.

BACKGROUND OF THE INVENTION

1. Field of the Invention

The present invention relates to a method and a control device for automatic systems designed to operate movable barriers, in particular doors, shutters and gates.

2. Description of the Related Art

In order to comply with existing safety regulations for electric and electronic systems designed to operate and manage movable barriers such as gates, doors and automatic shutters, certain types of safety devices have been widely adopted. Said safety devices are generally composed of infrared photocells and sensing edges (active pressure-sensitive components) which are very common because they result in low production and sales costs and also ensure the necessary level of safety required by the regulations. In particular, these devices must ensure the stoppage as rapidly as possible and the immediate reversal in the direction of movement of the movable barrier in the case where an object, a person or an animal obstructs the normal trajectory thereof or there is an impact.

For this purpose the automatic systems for movable barriers are equipped with at least two pairs of photocells (one at a height of 50 cm from the ground and the other at 100 cm) on each side of the access opening, and at least one sensing edge. Since the sensing edge must be fixed to the end of the movable barrier which reaches a fixed end-of-travel point, it is required to provide complex and costly means for connecting together the sensing edge and the electric and electronic system.

The connection means according to the state of the art are of the extendable or sliding type which are fixed directly on the inner side of the movable barrier and pass along the whole length of the said barrier before being connected to the electric and electronic system.

A generic control device 100 for gates, forming part of the state of the art, is shown in FIG. 1. It is essentially composed of an electric motor 102 for operating a barrier 103, a control unit (not shown, usually incorporated inside the motor) which manages and programs the movements of the gate 103, means 105 for controlling opening or closing of the gate 103 (remote control devices, key-operated switches, keypads, etc.), sensors and/or warning devices ensuring the safety of the system (photocells 107, sensing edges 108, 208 and flashing lamp 109), as well as the necessary electric and electronic means (buses, cables, etc.).

The photocells 107 consist of at least one pair for each access/side of the barrier 103 (one pair on the inner side and one pair on the outer side) and are positioned as dose as possible to the moving barrier 103, in order to prevent the formation of access zones which are not monitored and therefore not safe. Two sensing edges 108 are located on the end of the barrier 103 and on the surface of a fixed body 119 (such as a support column, see FIG. 1) in order to prevent accidental crushing or impacts.

A known solution envisages as a connection to the electric/electronic system for a sensing edge, fixed to one end of the sliding barrier, a coiled (spring-type) extendable cable, the ends of which are respectively connected to the sensing edge and to the electric/electronic system. The coiled cable is housed inside a guide tube fixed directly onto the inner side of the movable barrier.

Another known solution envisages a container tube housing inside it a cable and a sliding cable-holder chain (similar to a tracked element) having the same function as the coiled cable described above. The ends of the cable are connected respectively to the sensing edge and to the electric/electronic system.

All these connection means must be designed in a modular manner so as to be able to be adapted to each type of movable barrier. The manufacture, management and assembly of said connection means is complex and costly. Moreover they are difficult to produce with an aesthetically pleasing form.

A third known solution consists in a control device for sliding barriers, composed of a transmitter and a receiver which are used as means for transmitting the status of the sensing edge. The transmitter is fixed to the sliding barrier of the gate and, like the sensing edge, is battery-powered. The receiver is fixed to a stationary part of the gate (a column, wall, etc.) and is powered by the mains. The transmitter, which is directly connected to the sensing edge, transmits a constant and continuous signal (succession of pulses) to the receiver during all the movements and all the pauses in opening or closing of the barrier (continuous transmission). The continuous signal is interpreted by the control unit as an indication that there are no problems and/or obstacles. In the event of pressure against the sensing edge, the transmitter interrupts the transmission of the continuous signal to the receiver, and the control unit interprets this interruption in the signal as being an emergency condition, causing the immediate stoppage and reversal in the movement of the movable barrier.

Clearly the efficiency of this device is dependent upon the duration of the batteries powering the first photocell. In fact:
 the control device, and in particular the transmitter, is characterized by a high power consumption since it must transmit a continuous signal in order to avoid waiting times which may result in stoppage of the system;
 the technology used to manufacture standard batteries does not guarantee a minimum working period of a few months for the system, unless large-size batteries are used, with the consequent problem of where to house them;
 the device does not alert the user when the charging level of the battery is low so that it may be replaced in due time;
 the transmitter is able to encode a single type of message (one piece of information), with the risk that the receiver may be disturbed by a signal similar to that emitted by the transmitter (for example by another transmitter positioned incorrectly). This condition may result in the device assuming a "non safety" condition because a possible danger message may be wrongly interpreted or not be detected at all.

SUMMARY OF THE INVENTION

The object of the present invention is to provide a safety device for automatic systems designed to operate movable barriers, which eliminates the disadvantages of the present state of the art.

This object is achieved with a method according to the invention, in accordance with the claims below, and the associated devices for implementing it. Said method, in order to control a sliding barrier during the closing and opening movements so as to prevent a dangerous impact with an obstacle or crushing thereof, whereby a dosing edge of the barrier has, positioned along it, one or more sensors connected to a first transceiver able to exchange a signal with a second fixed transceiver in communication with an operating unit which manages the movement of the barrier, comprises the step of defining for said signal a communications protocol consisting of more than two signal configurations.

A control device for movable barriers according to the method of the invention allows the transmission of different signals, incorporating a transmission protocol consisting of more than two signal configurations having different coded meanings. The status of a sensor (for example a sensing edge), which is fixed to a movable barrier, is transmitted to the barrier control and operating unit without having to employ complex and costly cable connections.

BRIEF DESCRIPTION OF THE DRAWINGS

The advantages of the invention will emerge more clearly from the following description of a preferred embodiment of the invention, provided purely by way of a non-limiting example of a gate with a sliding barrier, with reference to the accompanying drawings in which.

DETAILED DESCRIPTION OF THE INVENTION

Figure 1:
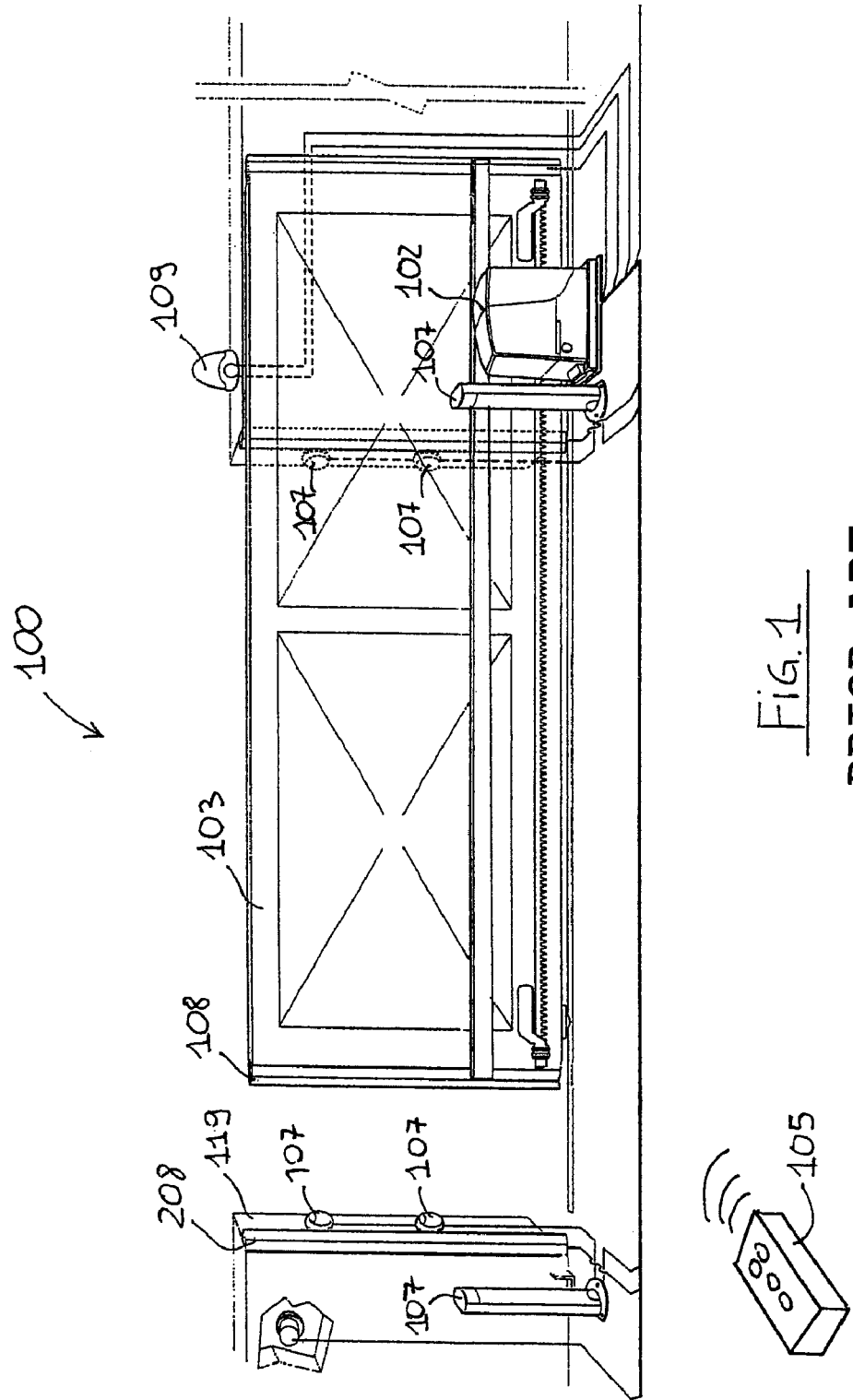
FIG. 1 shows a device according to the state of the art for controlling a movable barrier.
Figure 2:
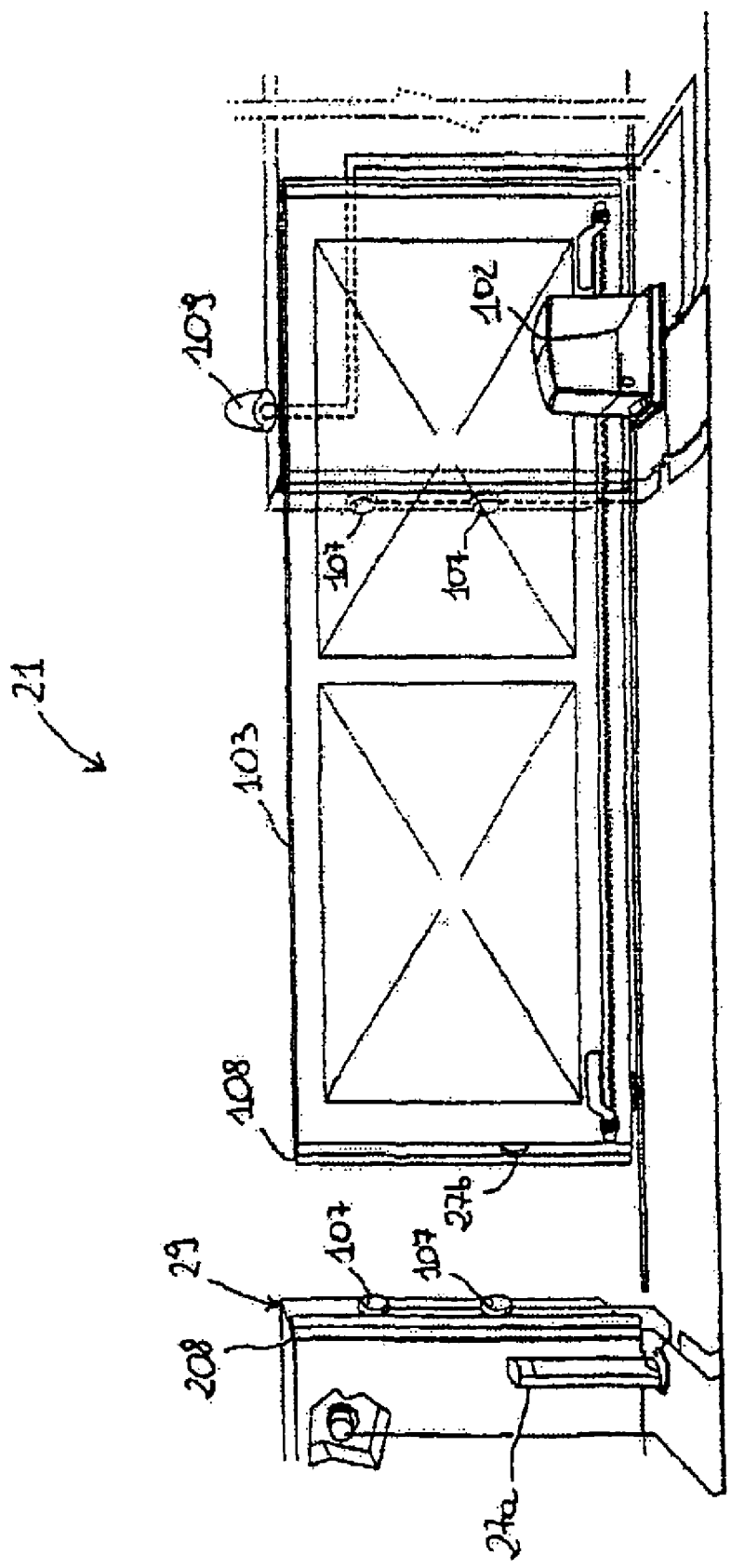
FIG. 2 shows a device for controlling a movable barrier, according to the present invention.

With reference to FIG. 2 (reference numbers the same as those in FIG. 1 indicate similar parts) this shows a control device 21 according to the invention, comprising a pair of photocells 27a, b. The first photocell 27a is a receiving photocell and is situated in the vicinity of an end-of-travel point 29 of the barrier 103; the second photocell 27b is a transmitting photocell and is positioned at the end of the barrier 103, close to a sensing edge 108 and connected thereto via traditional electric and electronic means (not shown). Another sensing edge 208 is positioned at the end-of-travel point 29 and is controlled in a known manner by a unit (not shown) controlling the barrier 103.

Figure 4:
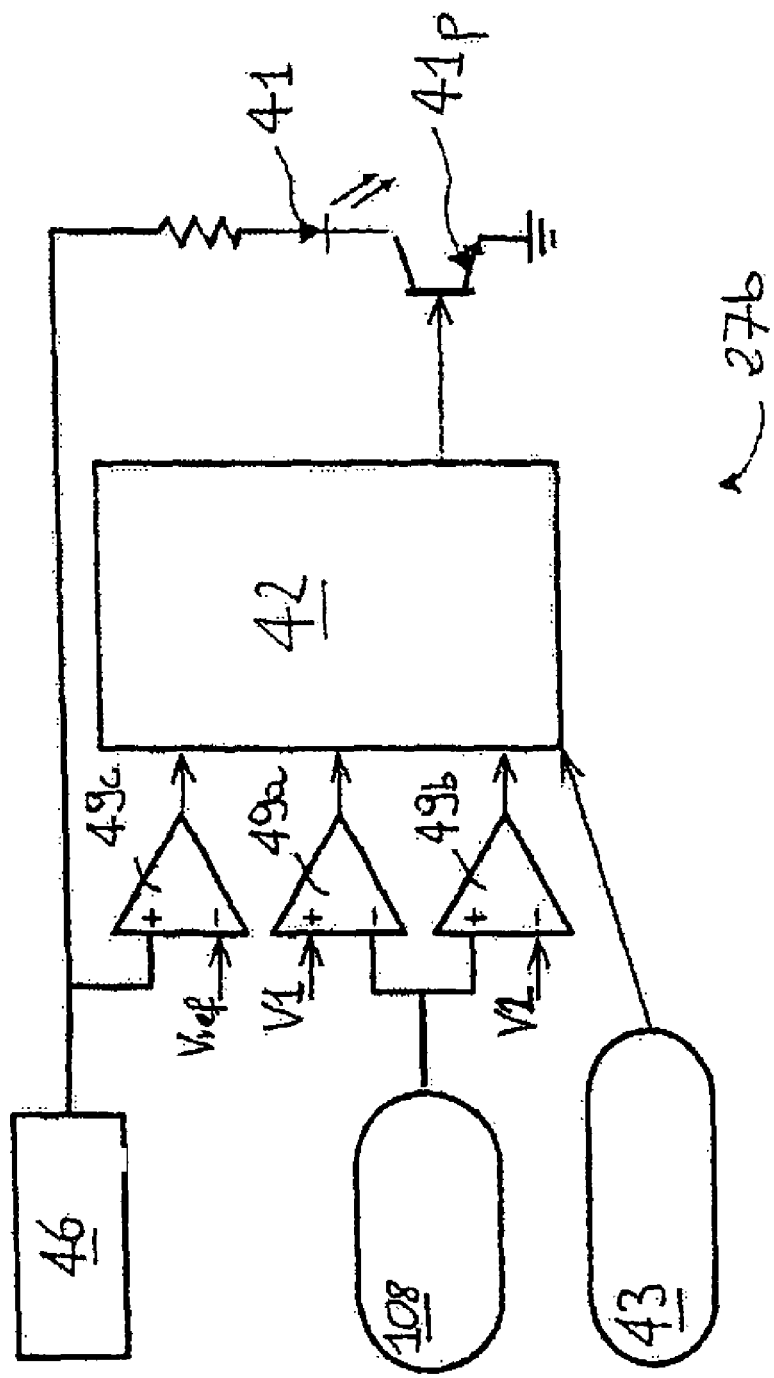
FIG. 4 shows a block diagram of a transmitting photocell.

The photocell 27b (see FIG. 4) is essentially composed of wireless means 41 for the transmission of (preferably infrared) pulses and associated driving stages 41 controlled by a microcontroller unit 42 which also processes the information sent by:

a vibration movement sensor 43 of the known type which detects the "status" of the barrier 103 (closed or moving);

two comparators 49a, b which are configured as window discriminators between two reference voltages V1 and V2 used as threshold values and which compare the (voltage) output signal of the sensing edge 108 with said reference voltages. The sensing edge 108 is used to detect the absence of obstacles or an emergency caused by an obstacles coming into contact with the sensing edge 108;

a comparator 49c which compares the voltage of a power supply battery 46 of the known type with a reference voltage Vref; in this way the microcontroller 42 is able to monitor continuously the charged state of the battery 46.

Figure 3:
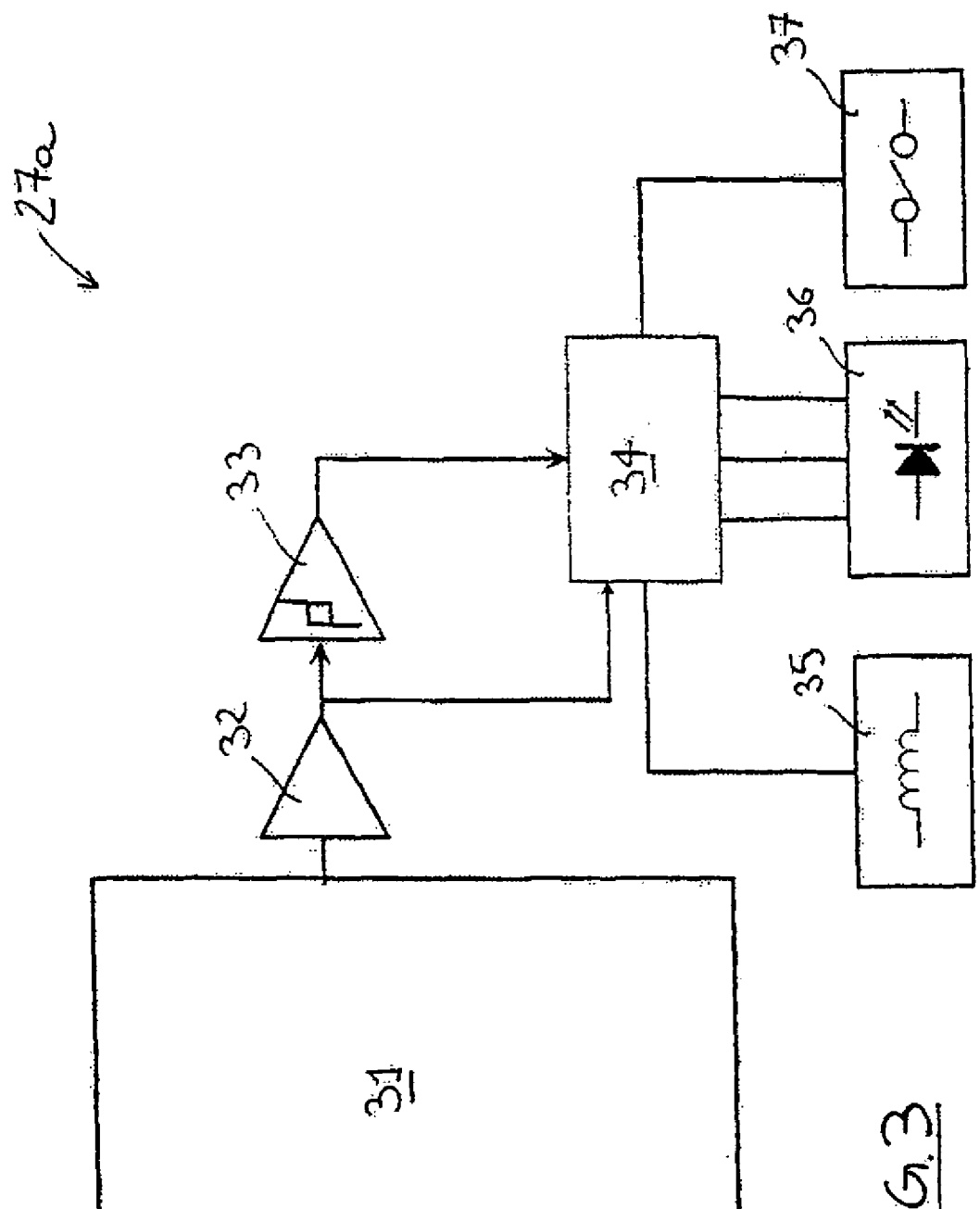
FIG. 3 shows a block diagram of a receiving photocell.

The photocell 27a (see FIG. 3) is essentially composed of a receiving unit 31 which receives and pre-amplifies pulses received from the transmitting photocell 27b, an amplifier 32 which further amplifies the pulses, a squaring device 33, a microcontroller 34 which interprets the signal received and exchanges control signals with the control unit via a general connection output 35 (of the known type), with a display component 36 able to display status or emergency messages, and with configuration components 37 of the known type able to define the ideal set-up according to the specific requirements of the user or the different applications. The output of the amplifier 32 is squared by the squaring device 33 and sent to a digital input of the microcontroller 34. By means of this input the microcontroller 34 is able to detect the time periods which lapse between one pulse and the next.

The operation of the control device 21 is characterized by a protocol for transmission between the two photocells 27a,b which has signal configurations (frames) repeated with a variable period depending on whether the device is in "fast" mode (for example with a period=14.5 ms) or in "slow" mode (for example with a period=463 ms). These preferred signal configurations are visible in FIGS. 5-10.

Switching between the "fast" mode and "slow" mode is regulated by the status of the movement sensor 43 which enables two particularly innovative features to be obtained:

by means of the microcontroller 42 of the transmitting photocell 27b, frames with a slow repetition ("slow" mode) when the barrier 103 is stationary and fast repetition ("fast" mode) when the barrier 103 is moving are sent to the receiving photocell 27a; therefore, constant communication is maintained between transmitting photocell 27b and receiving photocell 27a, independently of the movement status of the barrier 103: from the point of view of safety the control device 21 of the barrier 103 is extremely reliable;

detection of the movement status of the barrier 103 by means of the movement sensor 43 results in an increase in the working life of the battery 46, which, in the case of commercial batteries, may be as long as 10 years; in fact, by switching to "slow" mode when the barrier 103 is stationary, namely to a slower transmission frequency of the transmitting photocell 27b, the power consumption of the latter is greatly reduced, whilst increasing the working life of the battery 46.

Figure 5:
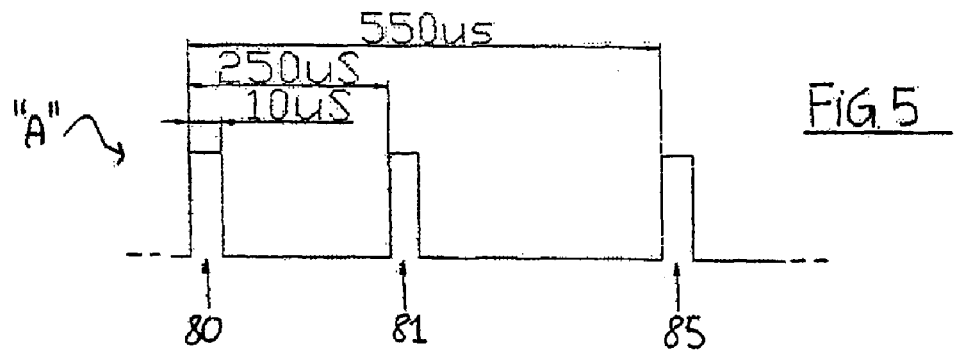
FIGS. 5, 6, 7, 8, 9 and 10 show signal configurations.
Figure 6:
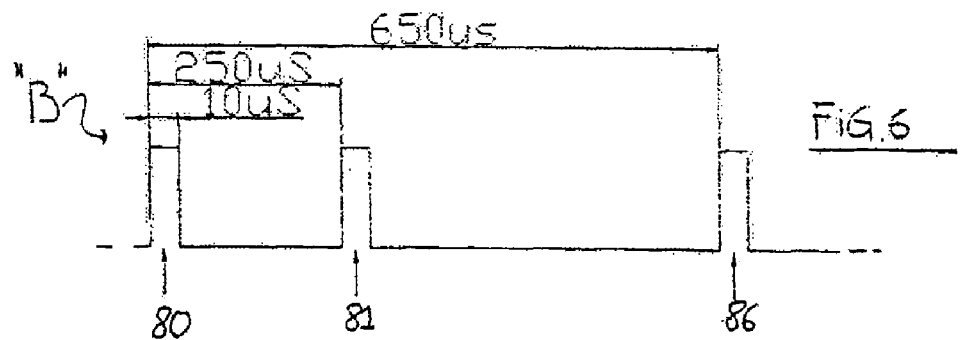
Figure 7:
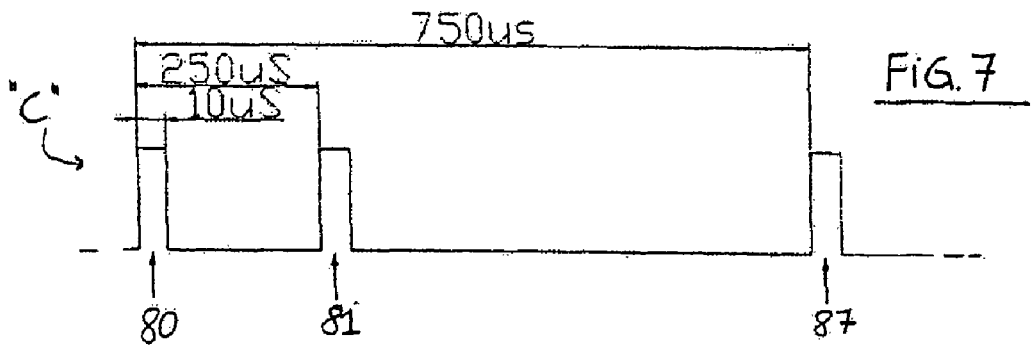
Figure 8:
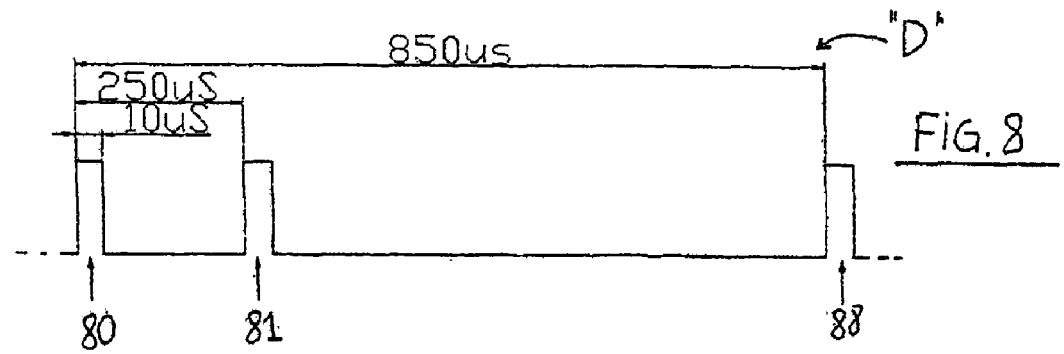
Figure 9:
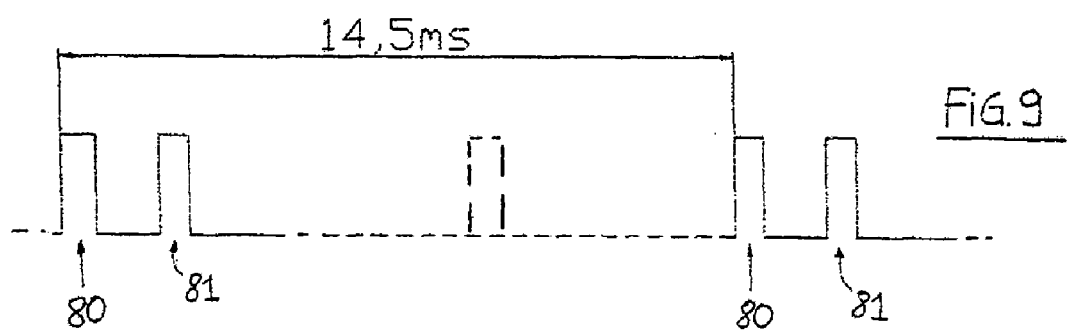
Figure 10:
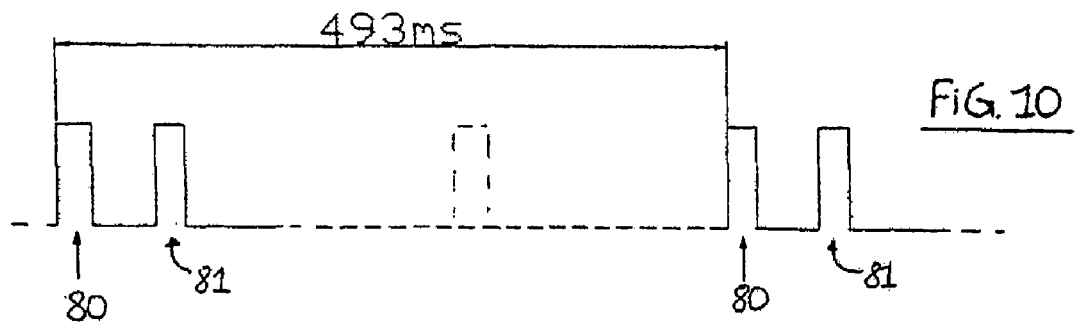

The signal configurations are composed as follows:

two start bits 80, 81, for example with a duration of 10 μs and an interval of 250 μs, which allow the receiving photocell 27a, in particular the microcontroller 34, to synchronize with the start of the transmitted frame;

a bit 85, for example with a duration of 10 μs and interval of 550 μs from the bit 80, which signals when the sensing edge is in the non-activation state, i.e. when there is no obstacle (see FIG. 5);

a bit 86, for example with a duration of 10 μs and interval of 650 μs from the bit 80, which signals when the sensing edge is in the active state, i.e. when there is contact with an obstacle (see FIG. 6);

a bit 87, for example with a duration of 10 μs and interval of 750 μs from the bit 80, for signalling to the receiving photocell 27a the switching to "slow" mode (see FIG. 7);

a bit 88, for example with a duration of 10 its and interval of 850 μs from the bit 80, which signals when the power of the battery 46 is low (see FIG. 8).

The bits 85, 86, 87, 88 are transmitted only when the event associated with them occurs. Therefore, there are in total four different signals which may be transmitted, however, with a different period, depending on the "slow" or "fast" transmission mode. For the sake of simplicity of the description, the signals shown in FIGS. 5 to 8 are defined as type A, B, C and D signals, respectively.

The particular feature of communication consisting of a signal which is repeated at non-constant, but known intervals allows the receiving photocell 27a to recognize the signal of the transmitting photocell 27b also when stray signals are present. The receiving photocell 27a has the fundamental feature of repeating internally the exact time intervals with which the transmitting photocell 27b sends the frames. In other words the receiving photocell 27a locks to the transmitting photocell 27b. When the receiving photocell 27a is not locked, it remains on standby until it recognizes the signal time patterns of the transmitting photocell 27b and then starts to repeat the exact transmission sequence. In this way the receiving photocell 27a regards as valid the frames which reproduce the sequence (with a suitable allowable variation) and regards as being not valid those frames which are out of sequence. If the non-valid frames are fairly sporadic events then these will simply be ignored, otherwise the receiving photocell 27a advantageously sets the device 21 to the maximum safety condition (system blocked).

If necessary, it is possible to use further disturbance rejection methods, for example by modifying the period which characterizes the "slow" mode and/or "fast" mode, varying it slightly between one frame and the next. For example, for the "slow" mode, the sequence of transmission periods could cyclically be 493 ms, 494 ms, 495 ms, 493 ms, 494 ms, 495 ms and so on.

The control device 21 functions in the following manner during the various operating phases:

Status of barrier 103 closed or open, but stationary. The microcontroller 42 processes the signal from the movement sensor 43 and the sensing edge 108. Being in a completely safe condition, it sends to the receiving photocell 27a a type A signal in "slow" mode;

Opening or closing of the barrier 103. Following a closing or opening command sent to the control unit, the electric motor 102 starts to move the barrier 103, the movement of which instantly excites the movement sensor 43 which in turn sends a "movement" signal to the unit 42. The latter enters into "fast" mode and again sends to the receiving photocell 27a, via the transmission means 41, a type A signal. The type A signal in "fast" mode therefore indicates the moving condition of the barrier 103. At the same time the control unit activates the flashing lamp 109 which signals the movement, using a known procedure. At the end of movement of the barrier 103, the unit 42 detects the absence of a signal from the movement sensor 43 and absence of a signal from the sensing edge 108 and therefore the barrier 103 is closed or open, but in any case stationary. After a predefined brief period where there is no movement of the barrier 103, with continued transmission of a type A signal in the "fast" mode, the unit 42 decides to switch to the "slow" transmission mode and informs the receiving photocell 27a of this by sending the type C signal.

Said "slow" transmission state, in which the type A signal is sent, lasts until a new movement signal is received from the movement sensor 43.

Detection of an emergency. During movement of the barrier 103—hence while the photocell 27b is transmitting a type A signal in "fast" mode—it may happen that the sensing edge 108 detects an obstacle. The unit 42 detects the variation in "status" of the sensing edge 108, by means of the comparators 49a,b, and sends an emergency signal to the receiving photocell 27a, using the type B signal configuration in "fast" mode. The microcontroller 34 receives this signal and orders the control unit to stop immediately and reverse the movement of the barrier 103.

Obviously, the pair of photocells 27a and 27b, in addition to transmitting the signals described above, function with the methods according to the state of the art, namely that if an object, person or animal passes through the beam thereof, the movable barrier 103 is stopped and its movement reversed. In fact, the receiving photocell 27a interprets the absence of signal from the transmitting photocell 27b as indicating the presence of an obstacle.

Monitoring of the battery 46. Despite the low power consumption of the batteries achieved as a result of the "slow" transmission mode, it is envisaged providing a signal configuration, specifically a type D signal, which is transmitted by the transmitting photocell 27b to the photocell 27a and which signals that the charge of the battery 46 is very low. In this case the microcontroller 34 will activate the display means 36 so as to display the status of the battery 46 (flashing light, signalling LED, etc.) and alert the user.

It is also clear that, during operation of the control device 21, it is possible to use one or more photocells 107 forming part of the known art, independently of operation of the invention.

The invention ensures an operating autonomy equivalent to the average working life calculated for all the components which form the control device 21, without the need for continuous replacement of the batteries 46. In this way unnecessary costs for assembling awkward and costly accessories, requiring the intervention of specialized personnel, are avoided.

The invention may be subject to many variations. For example, transmission between the photocells 27a,b may occur via radio or some other wireless system. Instead of the sensing edge 43 and/or together therewith it is possible to use other types of sensors (proximity sensors, ultrasound sensors, etc.). The microcontrollers 34, 42 may be replaced by any data processing unit or suitable circuit, while the photocells 27a,b may both be equipped with transceivers such as to obtain two-way data communication. This may be useful, for example, in the case where the barrier 103 has, as already mentioned, other sensors or devices in addition to the sensing edge 43 and information is to be received from the photocell 27a after data has been sent to it via the photocell 27b, for example regarding the state of a lock of the barrier 103, an access combination, etc. Moreover, the fixed transceiver may also be positioned far from the barrier 103, for example in the case of remote and centralized control of many movable barriers, and may be used to transmit to the control unit the status of sensors which are not positioned on the barrier 103.

In place of the battery 46 it would also be possible to use, for example, a solar cell power supply.

The movement sensor 43 could also not be located on the shutting element of the barrier 103, as in the case of a Doppler sensor. These and other variants are in any case included within the scope of protection of the following claims.

The invention claimed is:

1. A method for controlling closing and opening movements of a movable barrier for preventing accidental impact with an object, said movable barrier comprising a closing edge having, positioned thereon, one or more sensors connected to a first transceiver for exchanging a signal with a second fixed transceiver in communication with a control unit which manages the movement of the barrier;

the method comprising the steps of:

(a) defining for said signal a communications protocol consisting of more than two signal configurations;
(b) detecting with a movement sensor the movement status of the barrier; and
(c) varying the transmission period of said signal configurations after the movement status of the barrier is detected, wherein a first value of the transmission period is used when the barrier is stationary and a second value of the transmission period is used when the barrier is moving, the first value being higher than the second value;
wherein the second value is greater than zero.

2. The method according to claim 1, comprising a further step of associating a processing unit with the first transceiver or the second transceiver, the processing unit operably controlling the respective transceiver.

3. The method according to claim 1, comprising a further step of associating a synchronization signal for synchronizing the second fixed transceiver with a start of the signal configurations.

4. The method according to claim 1, comprising a further step of using a signal configuration to inform the control unit, via the second transceiver, if an obstacle comes into contact with the barrier in order to avoid the impact.

5. The method according to claim 1, comprising a further step of using a signal configuration to inform the second transceiver of switching to a transmission mode with a longer signal period.

6. The method according to claim 1, comprising a further step of powering the transceiver using an electrical energy accumulator.

7. The method according to claim 6, comprising a further step of using a signal configuration to inform the second transceiver when said accumulator does not provide sufficient power.

8. The method according to claim 1, comprising a further step of using an infrared signal.

9. The method according to claim 1, comprising a further step repeating an exact time interval with which a transmitting photocell sends the signal configurations.

10. The method according to claim 1, comprising a further step of varying cyclically the transmission period of said signal configurations.

11. The method according to claim 1, comprising a further step of positioning the second fixed transceiver in the vicinity of an end-of-travel point of the barrier.

12. The method according to claim 1, comprising a further step of using sensing edges as sensors.

13. The method according to claim 1, comprising a further step of characterizing said signal configurations by means of the temporal position of pulses.

14. The method according to claim 1, comprising a further step of interpreting the absence of a signal from the first transceiver as an indication that an obstacle is present.

15. The method according to claim 1,
wherein steps (b) and (c) are performed in a first cycle, repeating a second cycle of steps (b) and (c),
wherein in a second cycle when in step (b) the movement sensor detects a change in the movement of the barrier, in step (c) the transmission period is switched to other respective first or second value.

16. The method according to claim 1,
wherein steps (b) and (c) are performed in a first cycle, repeating a second cycle of steps (b) and (c),
wherein in a second cycle when in step (b) the movement sensor detects a change in the movement of the barrier, in step (c) the transmission period is switched to other respective first or second value.

17. A method for controlling closing and opening movements of a movable barrier for preventing accidental impact with an object, said movable barrier comprising a closing edge having, positioned thereon, at least one sensor connected to a first transceiver for exchanging a signal with a second fixed transceiver in communication with a control unit which manages the movement of the barrier;
the method comprising the steps of:
(a) defining for said signal a communications protocol consisting of more than two signal configurations;
(b) detecting with a movement sensor the movement status of the barrier; and
(c) varying the transmission period of said signal configurations after the movement status of the barrier is detected,
wherein a first value of the transmission period is used when the barrier is stationary and a second value of the transmission period is used when the barrier is moving, the first value being higher than the second value, and
when the transmission period has the second value at least two different configuration signals are used depending on the state of the at least one sensor;
the first and second value being greater than zero.

18. A method for controlling closing and opening movements of a movable barrier for preventing accidental impact with an object, said movable barrier comprising a closing edge having, positioned thereon, one or more sensors connected to a first transceiver for exchanging a signal with a second fixed transceiver in communication with a control unit which manages the movement of the barrier;
the method comprising the steps of:
(a) defining for said signal a communications protocol consisting of more than two signal configurations;
(b) detecting with a movement sensor the movement, status of the barrier; and
(c) varying the transmission period of said signal configurations after the movement status of the barrier is detected, wherein a first value of the transmission period is used when the barrier is stationary and a second value of the transmission period is used when the barrier is moving, the first value being higher than the second value;
the first and second value being greater than zero.

* * * * *